United States Patent [19]

Yowler

[11] Patent Number: 5,227,864
[45] Date of Patent: Jul. 13, 1993

[54] SYSTEM FOR LEVELING WORKPIECES

[75] Inventor: Michael A. Yowler, St. Paris, Ohio

[73] Assignee: Spectra-Physics Laserplane, Inc., Dayton, Ohio

[21] Appl. No.: 715,379

[22] Filed: Jun. 14, 1991

[51] Int. Cl.⁵ .............................................. G01B 11/00
[52] U.S. Cl. ..................................................... 356/400
[58] Field of Search ............................... 356/399–401, 356/138, 143, 152, 153, 141, 142, 248; 33/227, 290, DIG. 21, 293, 294, 296

[56] References Cited

U.S. PATENT DOCUMENTS

| | | | |
|---|---|---|---|
| 4,031,629 | 6/1977 | Paluck | 33/290 |
| 4,035,084 | 7/1977 | Ramsay | 356/152 |
| 4,062,634 | 12/1977 | Rando et al. | 356/248 |
| 4,653,910 | 3/1987 | Poling | 356/152 |
| 4,676,598 | 6/1987 | Markley et al. | 356/138 X |
| 4,676,634 | 6/1987 | Peterson | 356/4 |
| 4,770,480 | 9/1988 | Teach | 356/138 X |
| 4,820,041 | 4/1989 | Davidson et al. | 356/399 |
| 4,852,983 | 8/1989 | Fein | 350/453 |
| 4,907,874 | 3/1990 | Ake | 356/4 |
| 4,976,538 | 12/1990 | Ake | 356/4 |

OTHER PUBLICATIONS

Model 910i Laser Level brochure, Spectra-Physics CAD, 1990.

*Primary Examiner*—Richard A. Rosenberger
*Assistant Examiner*—K. P. Hantis
*Attorney, Agent, or Firm*—Killworth, Gottman, Hagan & Schaeff

[57] ABSTRACT

A laser alignment apparatus is provided for use in positioning workpieces relative to one another and first and second spaced-apart substantially parallel reference planes. The laser alignment apparatus comprises a first projector for providing first and second reference beams of light disposed in a substantially orthogonal relationship with respect to one another. A second projector provides third and fourth reference beams of light disposed in a substantially orthogonal relationship with respect to one another. The first and second projectors are positioned relative to one another so that the first and third reference beams of light are substantially collinear with one another and the second and fourth reference beams of light are positioned substantially parallel to one another. The second and fourth reference beams of light define the first and second substantially parallel reference planes and permit the workpieces to be positioned relative to one another and the first and second parallel reference planes.

19 Claims, 9 Drawing Sheets

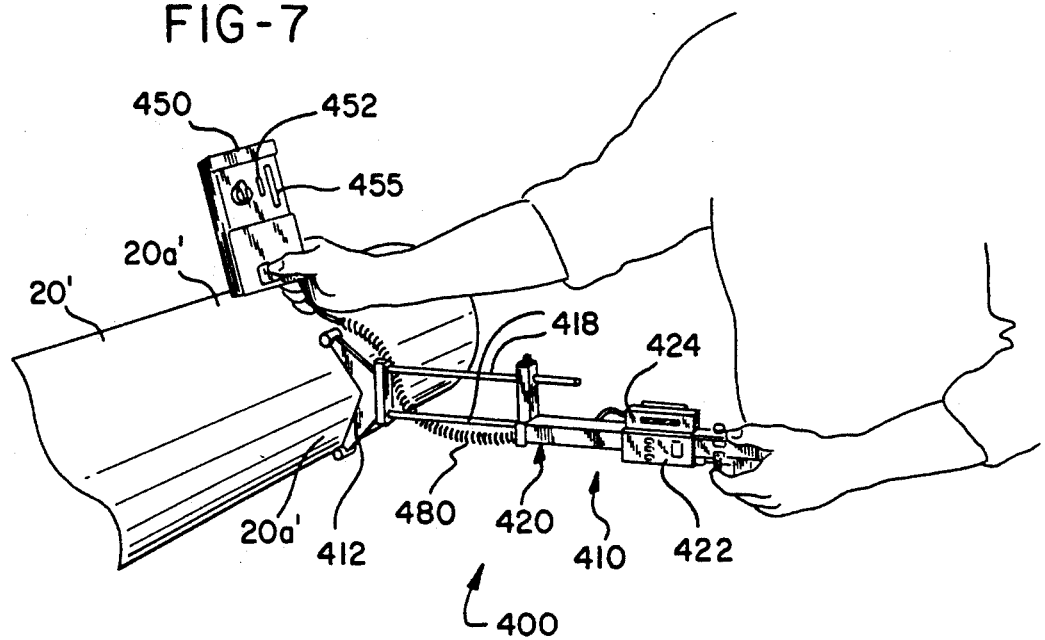
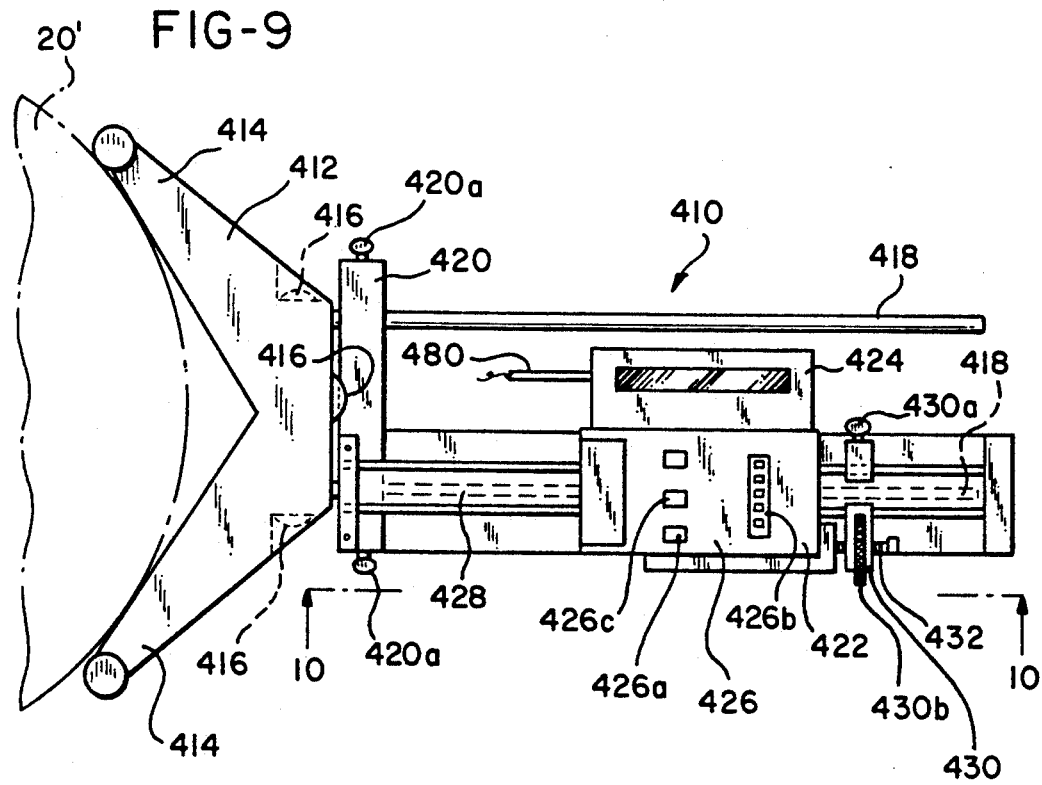

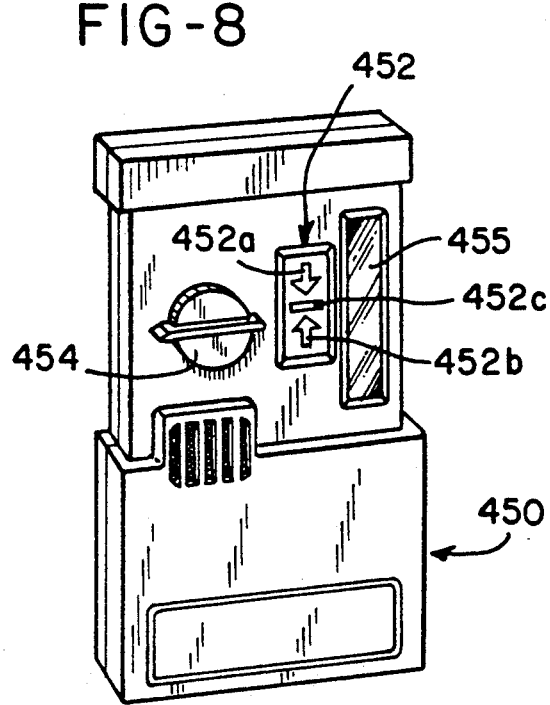
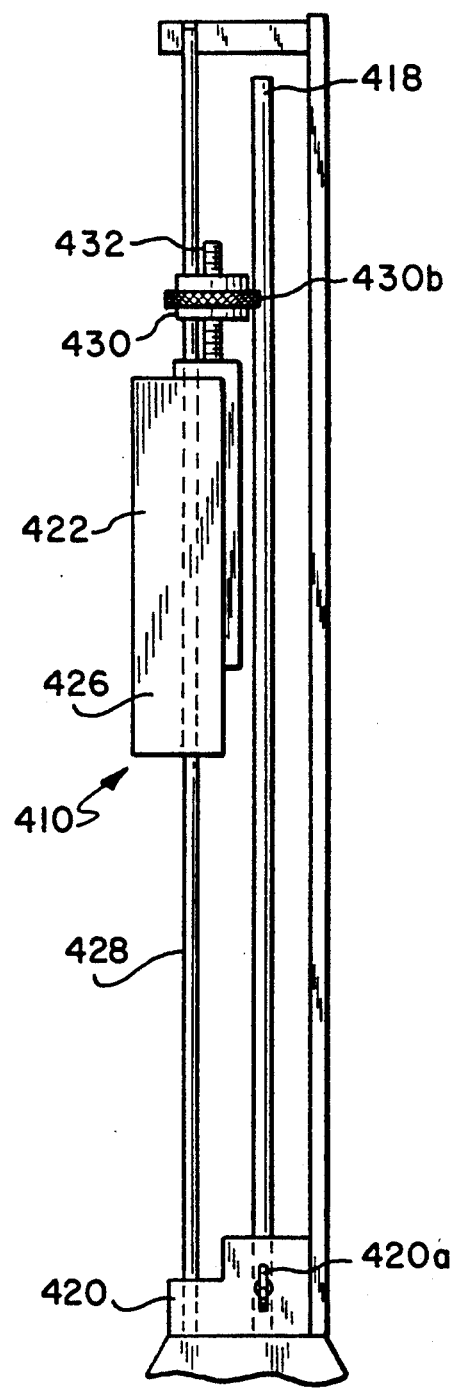

SYSTEM FOR LEVELING WORKPIECES

BACKGROUND OF THE INVENTION

The present invention relates to a method and apparatus for providing reference laser beams of light and, more particularly, to such a method and apparatus which is employed for leveling and squaring workpieces such as machine rolls.

U.S. Pat. Nos. 4,062,634; 4,035,085; and, 4,031,629 all disclose rotating laser beam projector devices. In each projector device, a generally horizontal rotating laser beam is produced by projecting a primary laser beam generally upward and then deflecting the beam by 90 degrees within a penta-mirror or pentaprism assembly. The pentaprism assembly is rotated about a vertical axis to cause the horizontal beam to rotate. In the past, some laser projector devices have included a removable pentaprism assembly. With such a projector device, the plane defined by the rotating beam could be aligned with a building structure, for example a wall, and the pentaprism assembly could thereafter be removed to produce a reference line normal to the wall.

U.S. Pat. No. 4,676,598 discloses a laser beam projector device which produces an upwardly extending, stationary reference beam and a rotating reference beam perpendicular thereto. With this laser projector device, pentaprism assembly removal is not necessary since the projector device produces an upwardly extending, stationary reference beam.

It has also been known in the past to employ a laser beam projector, similar to the one disclosed in the '598 patent, in combination with a separate penta-prism assembly for parallel machine roll alignment. In this system, the laser beam projector, which emits stationary and rotating reference beams disposed in a substantially orthogonal relationship with one another, is initially positioned on a machine offset center line. The projector is aligned with the offset center line so that the stationary reference beam lies in a vertical plane with the offset center line, and the rotating reference beam is positioned parallel to a further vertical plane in which a head roll of the machine is positioned. The separate penta-prism assembly is positioned downstream from the projector and is likewise positioned on the offset center line. The stationary reference beam is diverted by the separate penta-prism assembly so as to form an alignment reference beam of light for alignment of a second roll of the machine with the head roll. This system, however, has been found to be disadvantageous because it is difficult and time consuming to properly align the separate penta-prism assembly on the offset center line so that the alignment reference beam and the rotating reference beam are parallel with one another to permit accurate alignment of a second roll with the head roll.

It is seen, therefore, that there is a need for a laser alignment system which can be easily and accurately set-up for purposes such as parallel roll alignment.

SUMMARY OF THE INVENTION

This need is met by the present invention wherein apparatus is provided for defining first and second substantially parallel reference planes with beams of light so as to permit workpieces to be aligned and positioned relative to one another and the first and second substantially parallel reference planes. The apparatus comprises first and second laser beam projectors, each of which provides a stationary reference beam and a rotating reference beam. The two reference beams emitted by each of the projectors are disposed in a substantially orthogonal relationship with respect to one another. The first and second projectors are positioned with respect to one another so that the two stationary reference beams are substantially collinear with one another and the rotating beams are positioned substantially parallel to one another. The rotating beams of light define the first and second substantially parallel reference planes and permit the workpieces to be positioned relative to one another and the first and second parallel reference planes.

In accordance with a first aspect of the present invention, a laser alignment apparatus is provided for use in positioning machine components relative to one another and first and second spaced-apart substantially parallel reference planes. The laser alignment apparatus comprises: first projector means for providing first and second reference beams of light disposed in a substantially orthogonal relationship with respect to one another, and second projector means for providing third and fourth reference beams of light disposed in a substantially orthogonal relationship with respect to one another. The first and second projector means are positioned relative to one another so that the first and third reference beams of light are substantially collinear with one another and the second and fourth reference beams of light are positioned substantially parallel to one another. The second and fourth reference beams of light define the first and second substantially parallel reference planes and permit the machine components to be positioned relative to one another and the first and second parallel reference planes.

The first projector means preferably comprises: first generator means for providing a first primary light beam in a first path; first beam diverting means for intercepting the first primary beam and permitting a portion of the first primary beam to pass therethrough and emerge from the first projector means as the first reference beam, and for simultaneously diverting the remainder of the first primary beam in a direction which is substantially perpendicular to the first path to emerge from the first projector means as the second reference beam; and, first rotation means for rotating the first beam diverting means about a first axis which is generally parallel to the first path, whereby the second reference beam rotates about the first axis and thereby produces a moving reference beam of light which defines the first reference plane. The first projector means also includes first position control means for controlling the position of the first generator means and the first beam diverting means to ensure that the same are maintained in a predetermined plane.

The second projector means comprises: second generator means for providing a second primary light beam in a second path; second beam diverting means for intercepting the second primary beam and permitting a portion of the second primary beam to pass therethrough and emerge from the second projector means as the third beam, and for simultaneously diverting the remainder of the second primary beam in a direction which is substantially perpendicular to the second path to emerge from the second projector means as the fourth beam; and, second rotation means for rotating the second beam diverting means about a second axis which is generally parallel to the second path, whereby the fourth beam rotates about the second axis and thereby produces a moving reference beam of light which defines the second reference plane. The second projector means also includes second position control means for controlling the position of the second generator means and the second beam diverting means to ensure that the same are maintained in a predetermined plane.

The first reference beam is intercepted by the second beam diverting means and a part of the first reference beam passes therethrough, is reflected by an end mirror on the second generator means, and is again intercepted by the second beam diverting means after it is reflected by the end mirror. The second beam diverting means permits a portion of the reflected part of the first beam to pass therethrough and simultaneously diverts the remainder of the reflected part of the first reference beam in a direction which is substantially perpendicular to the second path to emerge from the second projector means as an alignment reference beam.

The second projector means preferably further comprises telescopic means for simulating propagation of the part of the first reference beam over an extended distance resulting in an increase in a separation distance between center axes of the alignment beam and the fourth reference beam as they emerge from the second beam diverting means. The increase in separation distance between the center axes of the alignment and fourth reference beams permits misalignment of the first and third reference beams to be easily detected, thereby permitting accurate positioning of the first and second projector means with respect to one another to collinearly align the first and third reference beams. The telescopic means preferably comprises a converging lens and a diverging lens positioned intermediate the second generator means and the second beam diverting means.

The laser alignment system preferably further includes a detector device for use in indicating the position of a machine component relative to one of the second and fourth reference beams. The device comprises: a base positionable on the machine component; photodetector means for sensing the one reference beam and generating detection signals in response thereto; circuit means associated with the photodetector means for determining the relative position of the one beam relative to a reference band; display means connected to the photodetector means for providing an indication of the position of the one beam with respect to the reference band; and variable gauge means adjustably connected to the base and mounting the photodetector means thereon for movement relative to the base to permit the photodetector means to be positioned with the one beam substantially on line with the reference band. The variable gauge means includes means for initializing the gauge to an initial output reading when the photodetector means is located at an initial on-line reference position relative to the base and means for indicating a change in the position of the photodetector means from the initial reference position.

In accordance with a second aspect of the present invention, a laser alignment apparatus is provided for use in positioning first and second workpieces relative to one another and first and second spaced-apart substantially parallel reference planes. The laser alignment apparatus comprises: first projector means for providing first and second reference beams of light disposed in a substantially orthogonal relationship with respect to one another; and second projector means for providing third and fourth reference beams of light disposed in a substantially orthogonal relationship with respect to one another. The first and second projector means are positioned relative to one another so that the first and third reference beams of light are substantially collinear with one another and the second and fourth reference beams of light are positioned substantially parallel to one another. The second and fourth reference beams of light define the first and second substantially parallel reference planes and permit the first and second workpieces to be positioned relative to one another and the first and second parallel reference planes.

The first reference beam is intercepted by the second projector means and a part of the first reference beam passes through a beam diverter, is reflected by an end mirror contained in the second projector means, and is again intercepted by the beam diverter. The beam diverter permits a portion of the reflected part of the first beam to pass therethrough and simultaneously diverts the remainder of the reflected part of the first reference beam in a direction which is substantially perpendicular to the portion of the reflected part of the first beam to emerge from the second projector means as an alignment reference beam.

The second projector means preferably further comprises telescopic means for simulating propagation of the part of the first reference beam over an extended distance. The telescopic means comprises a converging lens and a diverging lens located within the second projecting means.

In accordance with a third aspect of the present invention, a laser alignment apparatus is provided for use in positioning first and second workpieces relative to one another and first and second spaced-apart substantially parallel reference planes. The laser alignment apparatus comprises: projector means for providing first and second reference beams of light disposed in a generally orthogonal relationship with respect to one another; and receiving means for intercepting the first reference beam of light and reflecting a part of the first reference beam of light into third and fourth reference beams of light disposed in a generally orthogonal relationship with respect to one another. The projector means and the receiving means are positioned with respect to one another so that the first and third reference beams of light are substantially collinear with one another and the second and fourth reference beams are positioned substantially parallel to one another. The second and fourth reference beams define the first and second reference planes and permit the first and second workpieces to be positioned relative to one another and the first and second reference planes. Distance simulator means are associated with the receiving means for simulating propagation of the part of the first reference beam over an extended distance as it passes into and out of the receiving means to permit the receiving means to be accurately positioned with respect to the projector means.

Accordingly, it is an object of the present invention to provide a laser alignment system which can be easily and accurately set-up for purposes such as parallel roll alignment. It is an additional object of the present invention to provide a laser alignment apparatus comprising first and second laser beam projectors and a laser beam detector device for use in positioning workpieces relative to one another and first and second spaced-apart substantially parallel reference planes. It is a further object of the present invention to provide a laser alignment apparatus comprising a laser projector, a receiver and a laser beam detector device for use in positioning workpieces relative to one another and first and second spaced-apart substantially parallel reference planes. This and other objects and advantages of the invention will be apparent from the following description, the accompanying drawings and the appended claims.

BRIEF DESCRIPTION OF THE DRAWINGS

FIG. 7 is a perspective view of the laser beam detector device of FIG. 6 positioned on a first end 20a' of roll 20';

FIG. 8 is a perspective view of the receiver unit of the laser beam detector shown in FIG. 6;

FIG. 9 is an side view of the laser beam detector device of FIG. 6 positioned on a first end 20a' of roll 20'; and FIG. 10 is an enlarged, cross-sectional view taken generally along line 10—10 in FIG. 9.

DETAILED DESCRIPTION OF THE INVENTION

Figure 1:
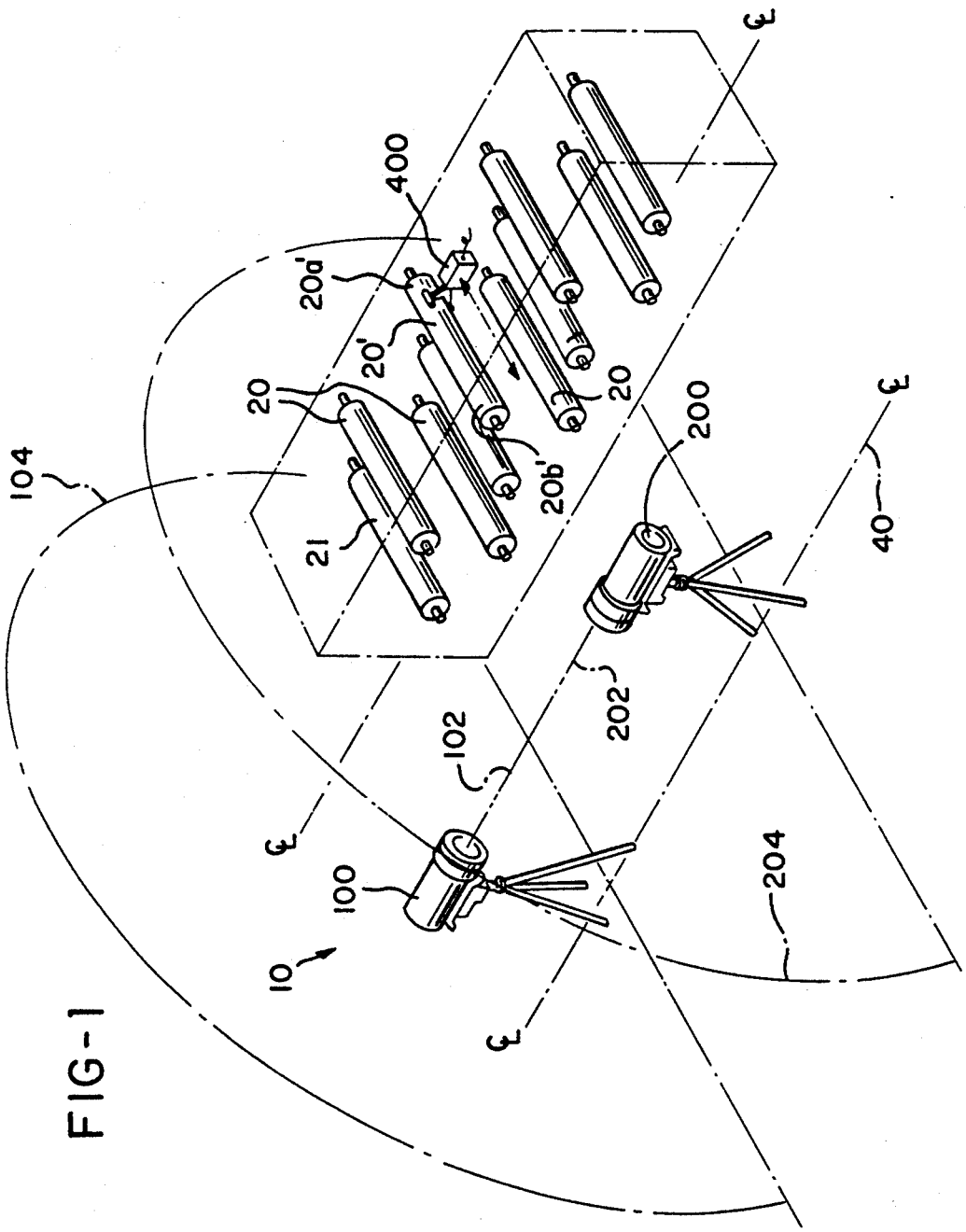
FIG. 1 is a perspective view of laser alignment apparatus of the present invention emitting first and third collinear reference beams and second and fourth parallel reference beams for positioning machine rolls relative to one another.
Figure 2:
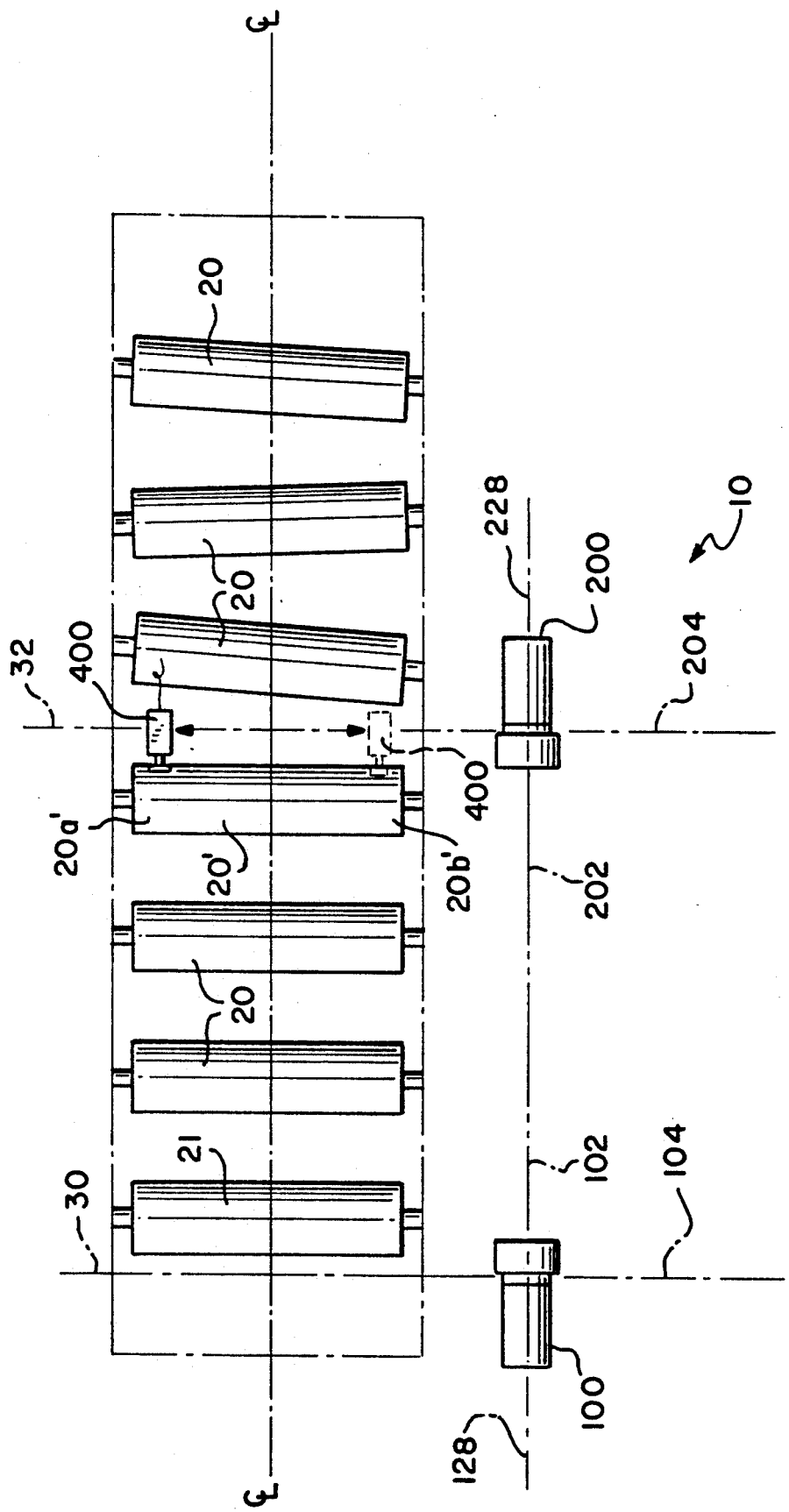
FIG. 2 is a plan view of the apparatus shown in FIG. 1.

Reference is made to FIGS. 1 and 2 of the drawings which illustrate laser alignment apparatus 10 of the present invention for use in positioning workpieces, such as machine rolls 20 and a head roll 21, relative to one another and first and second spaced-apart substantially parallel reference planes 30 and 32. The laser alignment apparatus 10 comprises first and second laser beam projectors 100 and 200, respectively, each of which are essentially equivalent to the device disclosed in Markley et al., U.S. Pat. No. 4,676,598, which is incorporated herein by reference. The first projector 100 serves to provide first and second reference beams 102 and 104, respectively, which are disposed in a substantially orthogonal relationship with respect to one another. The second projector 200 serves to provide third and fourth reference beams 202 and 204, respectively, which are likewise disposed in a substantially orthogonal relationship with respect to one another.

As shown in FIGS. 1 and 2, the first and second projectors 100 and 200 are located on an offset center line 40 and positioned relative to one another so that the first and third reference beams of light 102 and 202, respectively, are substantially collinear with one another, and the second and fourth reference beams of light 104 and 204, respectively, are positioned substantially parallel to one another. The second and fourth reference beams of light 104 and 204 define the first and second substantially parallel reference planes 30 and 32 and, as will be discussed in further detail below, permit the machine rolls 20 and the head roll 21 to be positioned relative to one another.

Figure 3:
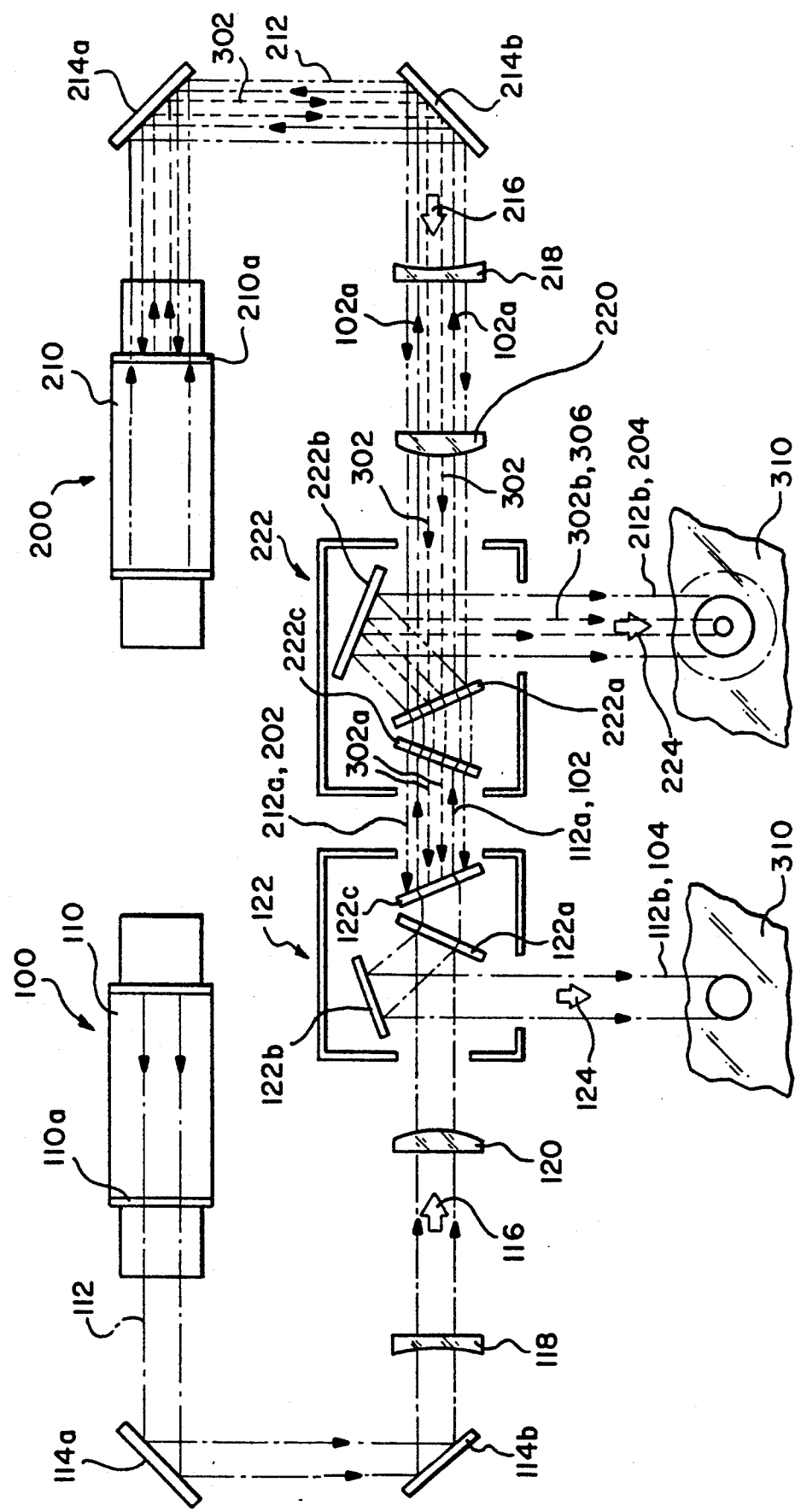
FIG. 3 is a schematic plan view of components of the first and second projectors of the present invention and illustrating the first and third beams being substantially collinear with one another.
Figure 4:
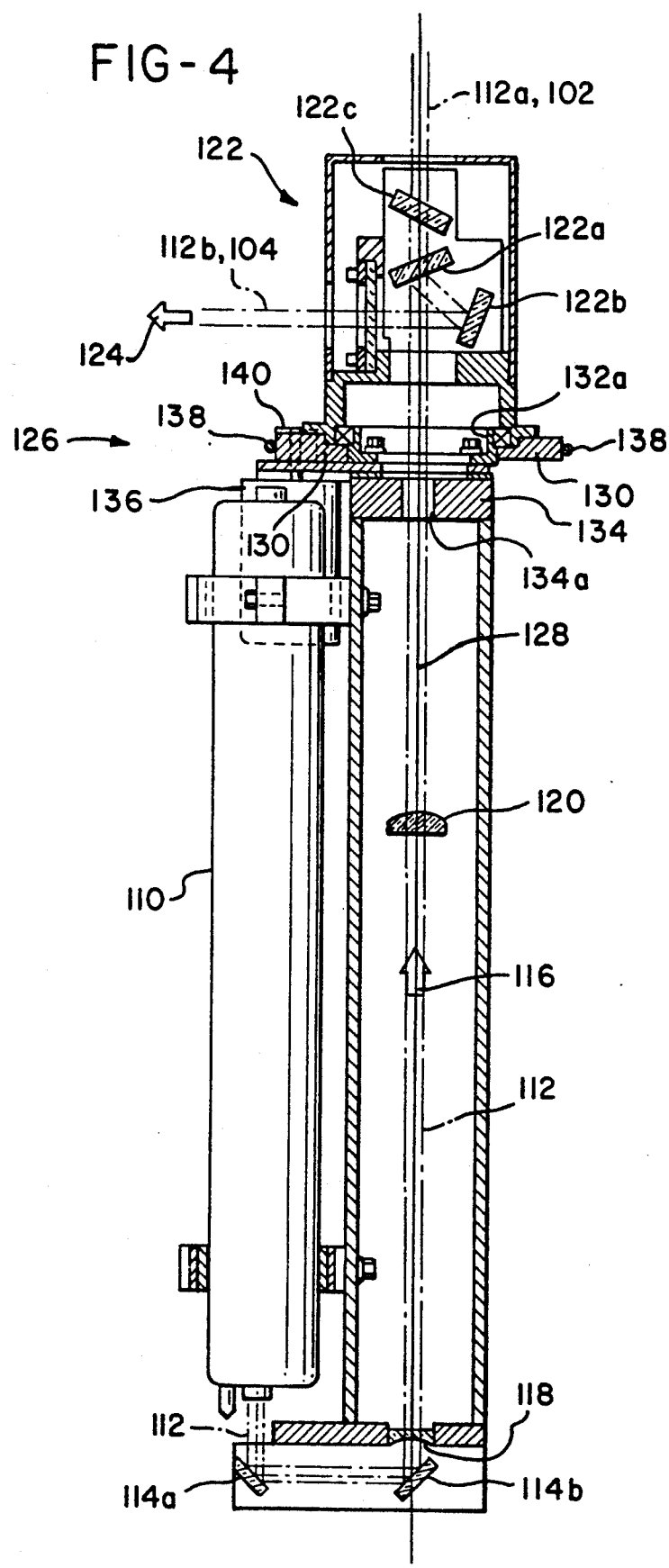
FIG. 4 is a partially schematicized view, with parts in section, of a laser beam generator, beam diverting means, rotation means, a diverging lens and a converging lens of a laser beam projector of the present invention.

Referring now to FIGS. 3 and 4, the first projector 100 comprises a first laser beam generator 110 which emits a first primary light beam 112. Positioned downstream from the first generator 110 are first and second mirrors 114a and 114b which intercept and divert the first primary beam 112 into a first path, denoted by arrow 116. As the primary light beam 112 travels along the first path 116 it passes through a diverging lens 118 and a converging lens 120 before entering into a first diverting means 122. The diverging and conveying lenses 118 and 120 act to expand the diameter and lower the divergence of the beam 112.

The first diverting means 122 is substantially similar to the beam diverting means disclosed in U.S. Pat. No. 4,676,598 and comprises a first partially transmissive deflecting element 122a, a second deflecting element 122b positioned at an angle of approximately 45° with respect to the first deflecting element 122a, and a third substantially transmissive deflecting element 122c. The first diverting means 122 is provided for intercepting the first primary beam 112 and permitting a portion 112a of the first primary beam 112 to pass therethrough and emerge from the first projector 100 as the first reference beam 102 and for simultaneously diverting the remainder 112b of the first primary beam 112 in a direction 124 which is substantially perpendicular to the first path 116 to emerge from the first projector 100 as the second reference beam 104.

First rotation means 126, shown in FIG. 4, are also provided for rotating the first beam diverting means 122 about a first axis 128 which is generally collinear with the first path 116. The first rotation means 126 is substantially similar to the rotation means disclosed in Rando et al., U.S. Pat. No. 4,062,634, the disclosure of which is incorporated herein by reference. The first rotation means 126 comprises a driven pulley 130 operatively connected to the first beam diverting means 122 so as to rotate therewith about a bearing assembly 132. The bearing assembly 132 is mounted on a bearing mount 132a which, in turn, is mounted onto a block 134 having an opening therethrough 134a for permitting the beam 112 to pass. A motor 136 is provided and serves to rotate a belt 138 via a drive pulley 140 so as to rotate the driven pulley 130, and hence the first beam diverting means 122 about the first axis 128. By rotating the first beam diverting means 122, the second reference beam 104 also rotates about the first axis 128 resulting in a moving reference beam of light which defines the first reference plane 30.

The first projector 100 further includes first position control means (not shown), which is similar to the self-leveling control means disclosed in Rando et al., U.S. Pat. No. 4,062,634. The first position control means is provided for controlling the position of the first generator 110 and the first beam diverting means 122 to ensure that the same are maintained in a predetermined plane which, in the preferred embodiment, comprises a horizontal plane.

Referring again to FIG. 3, the second projector 200 comprises a second laser beam generator 210 which emits a second primary light beam 212. Positioned downstream from the second generator 210 are first and second mirrors 214a and 214b which intercept and divert the second primary beam 212 into a second path, denoted by arrow 216. As the primary light beam 212 travels along the second path 216 it passes through a diverging lens 218 and a converging lens 220 before entering into a second diverting means 222.

The second diverting means 222 is essentially identical to the first diverting means 122 and comprises a first partially transmissive deflecting element 222a, a second deflecting element 222b positioned at an angle of approximately 45° with respect to the first deflecting element 222a, and a third substantially transmissive deflecting element 222c. The second diverting means 222 is provided for intercepting the second primary beam 212 and permitting a portion 212a of the second primary beam 212 to pass therethrough and emerge from the second projector 200 as the third reference beam 202 and for simultaneously diverting the remainder 212b of the second primary beam 212 in a direction 224 which is substantially perpendicular to the second path 216 to emerge from the second projector 200 as the fourth reference beam 204.

Second rotation means (not shown) are provided for rotating the second beam diverting means 222 about a second axis 228, shown in FIG. 2, which is generally collinear with the second path 216. The second rotation means is constructed in the same manner as the first rotation means 126 and reference is made to FIG. 4 and the discussion of the first rotation means 126, supra, for a description of the elements which are employed in the construction of the second rotation means. Because the second beam diverting means 222 rotates about the second axis 228, the fourth reference beam 204 likewise rotates about the second axis 228 resulting in a moving reference beam of light which defines the second reference plane 32.

The second projector 200 further includes second position control means (not shown) for controlling the position of the second beam generator 210 and the second beam diverting means 222 to ensure that the same are maintained in a predetermined plane. The second position control means is also substantially similar to the position control means disclosed in U.S. Pat. No. 4,062,634.

As shown in FIG. 3, after the first reference beam 102 emerges from the first beam diverting means 122, it is intercepted by the second beam diverting means 222. A part 102a of the first reference beam 102 passes through element 222a and is intercepted and reflected by the second generator 210 while the balance thereof (not shown) is reflected away by element 222a. An end mirror 210a of the second generator means 210 acts to reflect the part 102a of the first reference beam 102 back toward the second beam diverting means 222 (the reflected part 102a is designated by reference numeral 302). The second diverting means 222 permits a portion 302a of the reflected part 302 to pass therethrough and simultaneously diverts the remainder 302b of the reflected part 302 in the direction 224 to emerge from the second projector means 200 as an alignment reference beam 306. In FIG. 3, the third reference beam 202 is not illustrated after it impinges upon element 122c, however, a part of it does travel through the first beam diverting means 122 and is reflected back toward the first beam diverting means 122 by end mirror 110a. Likewise, the portion 302a of the reflected part 302 also passes through deflecting element 122c even though it is not shown in FIG. 3 as doing so.

The first and second projectors 100 and 200 are properly positioned relative to one another on the offset centerline 40 when the first and third reference beams 102 and 202 are substantially collinear with one another. To permit the first and third reference beams 102 and 202 to be collinearly aligned, the second rotation means (not shown) is stopped so that the second beam diverting means 222 does not rotate continuously about axis 228, and the beam diverting means 222 is positioned so that the fourth reference beam 204 and the alignment reference beam 306 are directed toward a supporting structure 310, upon which the projector 200 is located, as shown in FIG. 3. The position of the projector 200 is adjusted until the alignment reference beam 306 is visible on the supporting structure 310 along with the fourth reference beam 204 and, preferably, is adjusted until the two beams 204 and 306 are in substantial alignment with one another. In the preferred embodiment, the second projector includes an opening in a block, similar to opening 134a in block 134 of FIG. 4, which is sized so as to permit the alignment beam 306 to only pass therethrough and be seen on the supporting structure 310 if the first and third beams 102 and 202 are in substantial alignment with one another. Consequently, in the preferred embodiment, an operator need only check to see if both the alignment beam 306 and the fourth reference beam 204 are visible on the supporting structure 310 to ensure that the first and third reference beams 102 and 202 are in substantial collinearity with one another. As noted above, a part (not shown) of the third beam 202 is reflected by end mirror 110a. Thus, it should be apparent that a portion of the reflected part of the third beam 202 may likewise be employed as an alignment beam for verification of the collinearity of the first and third reference beams 102 and 202.

Figure 5:
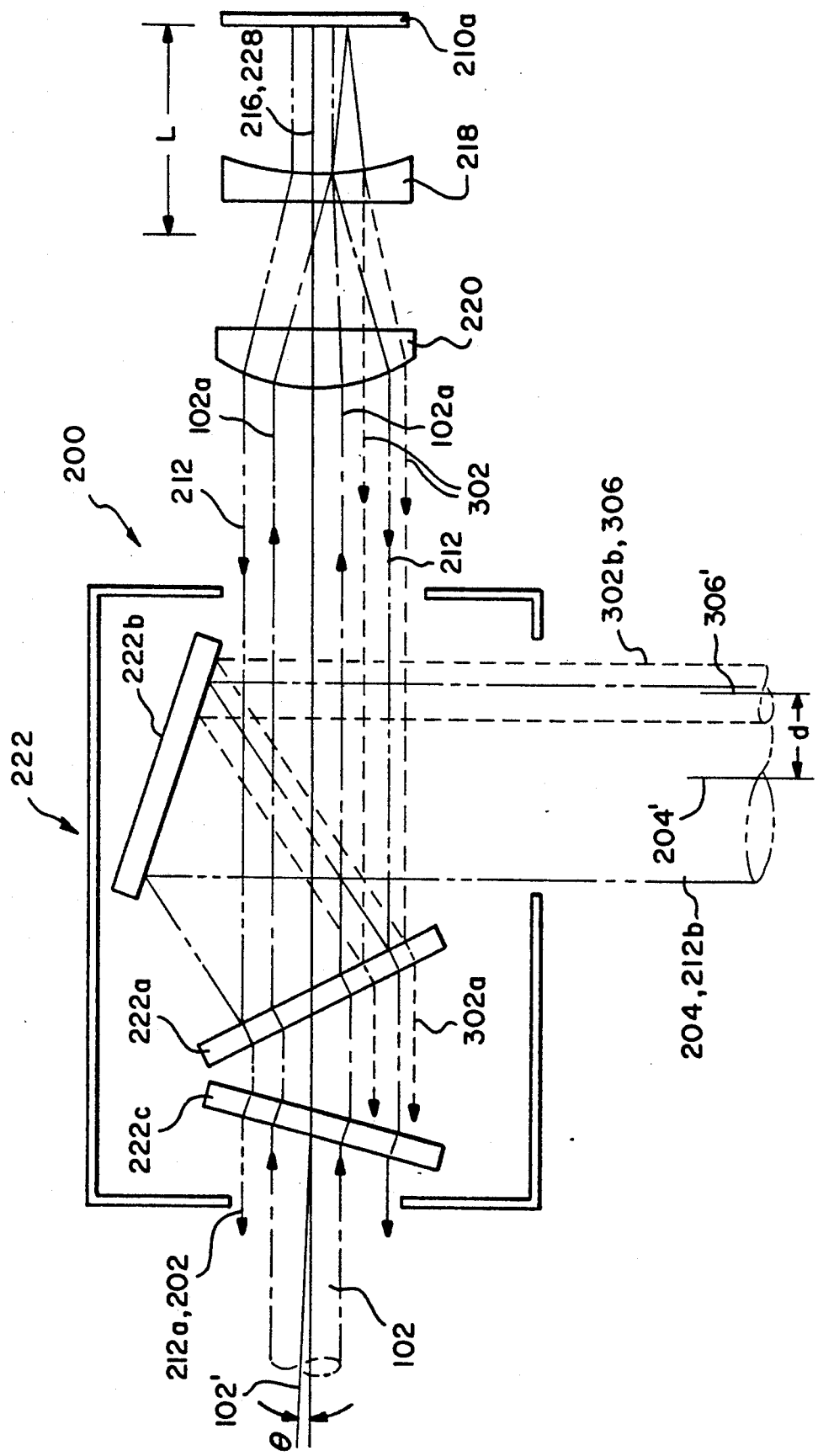
FIG. 5 is an enlarged schematic plan view of an end mirror of a laser beam generator, a beam diverting means, a diverging lens and a converging lens of a laser beam projector of the present invention and illustrating the magnifying effect of the lenses, which comprise a telescopic means, on a misaligned incoming stationary reference beam.

The diverging and converging lenses 218 and 220 of the second projector 200 act as telescopic means for simulating a propagation distance of the part (including the reflected part) 102a, 302 of the first reference beam 102 over an extended path of travel as the combined part 102a, 302 passes twice through the lenses 218 and 220. Referring to FIG. 5, the first reference beam 102 is shown entering into the second diverting means 222 at an angle Θ (angle Θ is defined as the angle between the center axis 102' of the first reference beam 102 and the second axis 228, and is shown exaggerated for purposes of illustration in FIG. 5) to the second axis 228. The diverging and converging lenses 218 and 220 act to simulate an effective propagation distance D for the first reference beam 102, 302, whereby D can be determined from the following equation:

$$D = 2L/M^2$$

where L is the distance between the mirror 210a and the focal point of lens 218, and M is the telescope magnification of the telescopic means, i.e., the lenses 218 and 220.

Because the first reference beam 102 enters into the second diverting means 222 at an angle Θ to the second axis 228, the telescopic means acts to augment a separation distance between the center axis 306' of the alignment beam 306 and a center axis 204' of the fourth reference beam 204 as they emerge from the second beam diverting means 222. The distance d between the axes 306' and 204' can be determined by the following equation:

$$d = (D)(\Theta)$$

where D is the effective propagation distance, and Θ is the angle between the center axis 102' of the first reference beam 102 and the second axis 228.

The augmented separation distance d between the center axes 306' and 204' of the alignment and fourth reference beams 306 and 204 permits misalignment of the first and third reference beams 102 and 202 to be easily detected, thereby permitting accurate positioning of the first and second projectors 100 and 200 with respect to one another to substantially collinearly align the first and third reference beams 102 and 202.

In order to permit easy alignment of the machine rolls 20 and head roll 21 relative to one another and the first and second spaced-apart reference planes 30 and 32, the laser alignment apparatus 10 of the present invention preferably includes a laser beam detector device 400, shown schematically in FIGS. 1 and 2. During machine roll alignment, the first projector 100 is initially positioned so that the second reference beam 104 is substantially parallel to the head roll 21. The head roll 21 is normally fixed in place within the machine and serves as a reference for alignment of the remaining rolls 20. The second projector 200 is moved along the offset axis 40 and positioned at various points along the offset axis 40 to permit the remaining rolls 20 to be aligned relative to the head roll 21. After the second projector 200 is located on a given point on the offset axis 40, it is aligned with the first projector 100, in the manner described above, so that the first and third reference beams 102 and 202 are substantially collinear with one another. When this occurs, the roll 20' currently being positioned is then aligned relative to the second reference plane 32, which is defined by the fourth reference beam 204. As will be discussed in further detail below, the laser beam detector device 400 is used to determine the distance between the fourth reference beam 204 and each of the first and second opposing end portions 20a' and 20b' of the roll 20'. When the distances between the fourth reference beam 204 and the opposing ends portions 20a' and 20b' of the roll 20' are substantially equal, the roll 20' is substantially in parallel alignment with the head roll 21 and the second reference plane 32.

Figure 6A:
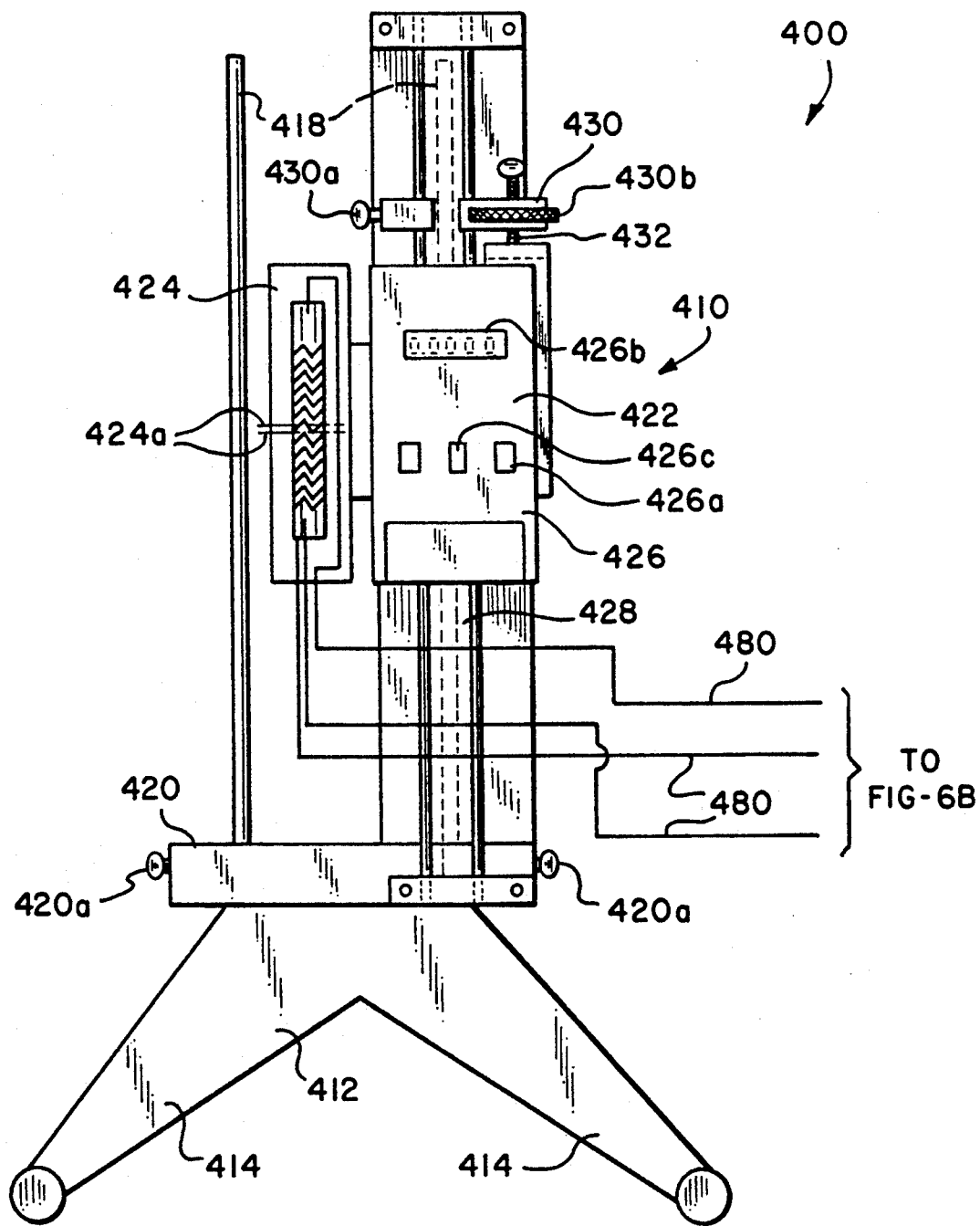
FIGS. 6A and 6B illustrate a laser beam detector of the present invention and a block diagram of the circuit means for the receiver unit of the laser beam detector device.
Figure 6B:
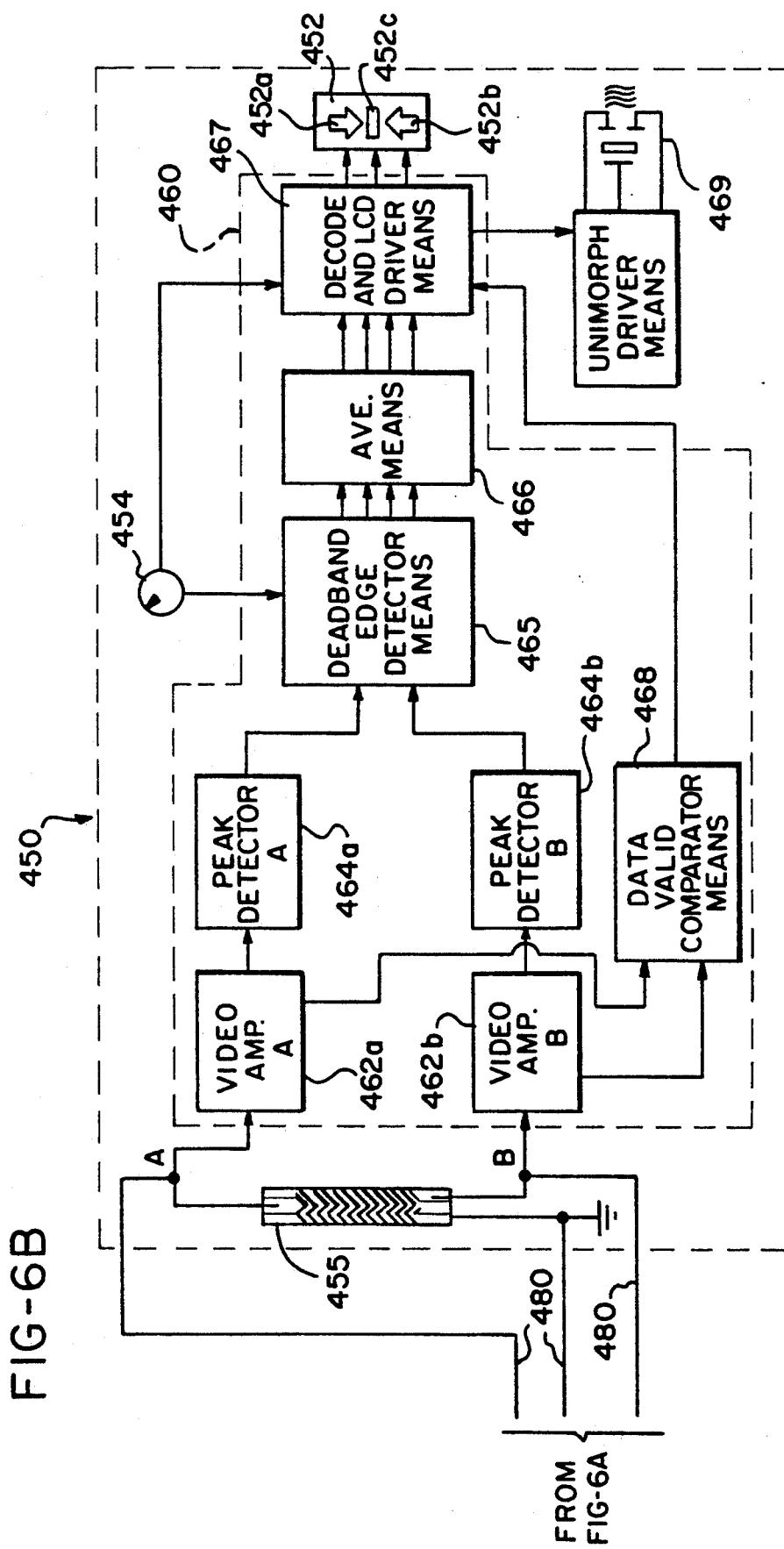

The preferred embodiment of the laser beam detector device 400 is shown in FIGS. 6A, 6B and 7 and comprises an adjustable photosensor unit 410 interconnected to a receiver unit 450 via a conductors 480. The photosensor unit 410 comprises a base 412 having feet 414 which are positionable on the roll 20', as shown in FIGS. 7 and 9. Preferably, the base 412 includes a plurality of level vials 416 associated therewith so as to permit the photosensor unit 410 to be properly positioned in a desired plane, e.g., a vertical or horizontal plane, on the roll 20'.

The photosensor unit 410 further includes a carriage 420 which is movable back and forth relative to the base 412 upon support rods 418 fixed to the base 412. The movable carriage 420 includes a plurality of thumbscrews 420a which permit the carriage 420 to be lockingly positioned at any desired location on the support rods 418. The carriage 420 supports a variable gauge means 422 which, in turn, supports a photodetector means 424. The photodetector means 424 preferably comprises two interdigitated photodetector elements, as disclosed in U.S. Pat. No. 4,976,538, the disclosure of which is hereby incorporated by reference, for sensing the position of the reference beam 204 and generating first and second detection signals A and B, respectively, in response thereto.

The receiver means 450 includes a circuit means 460, shown in FIG. 6B, for receiving the detection signals A and B from the photodetector means 424 via the conductors 480 and for determining the position of the beam 204 relative to a reference band, indicated by dashed lines 424a in FIG. 6A, which is centered between top and bottom portions of the two photodetector elements of the photodetector means 424. The circuit means 460 provides an indication of whether the beam 204 is above, below, or within the reference band 424a of the photodetector means 424 via a display 452. The display 452, which preferably is a liquid crystal display (LCD), includes a pair of arrows 452a and 452b, and an on-line bar 452c. The arrow 452a or the arrow 452b is activated if the beam 204 is above or below the reference band, respectively. On-line bar 452c is activated if the beam 204 falls within the reference band 424a. The receiver 450 further includes a control knob 454 for switching the receiver means 450 on and off and for varying the width of the reference band. If desired, the receiver 450 may include a second photodetector means 455 for permitting use of the receiver 450 as a laser beam detector device without requiring use of the photosensor unit 410.

The circuit means 460, shown in block diagram form in FIG. 6B, includes first and second video amplifiers 462a and 462b having outputs connected to peak detectors 464a and 464b. The peak detectors 464a and 464b provide output signals which are directly related in amplitude to the area of the two interdigitated photodetector elements illuminated. A deadband edge detector means 465 is responsive to the output signals from the peak detectors 464a and 464b for detecting whether the beam 204 is above or below the reference band 424a. The deadband edge detector means 465 is connected to an averaging means 466 which averages the output signals from the detector means 465 over a predetermined number of sweeps of the fourth reference beam 204 across the photodetector means 424. The averaging means 466 provides an output signal indicating that the beam 204 is above or below the reference band 424a only if the beam 204 is not on-line, i.e., within the reference band 424a, during a predetermined number of immediately preceding rotations or sweeps of the beam 204.

A decode and LCD driver means 467 receives and decodes the output signals from the averaging means 466, and sends a signal to the LCD display 452 to actuate the appropriate display symbol to indicate if the beam is above, below or within the reference band 424a. A data valid comparator means 468 is also provided and receives output signals from the amplifiers 462a and 462b and compares these signals to a threshold value. If the combined output signals do not exceed the threshold value, the display 452 is not illuminated. Accordingly, the comparator means 468 serves to eliminate noise signals generated by light sources other than the laser beam projector 200, such as sunlight and other ambient light sources. If desired, an audible indicator means 469 may also be provided for generating an audible signal corresponding to the position of the beam 204. The specific components comprising the circuit means 460 may include the circuitry disclosed in U.S. Pat. No. 4,676,634, the disclosure of which is hereby incorporated by reference.

The variable gauge means 422, also referred to as a variable height gauge, includes a distance sensor 426 slidably positioned upon a reference support 428. The distance sensor 426 is connected to an upper support 430 via a fine adjustment screw 432. The upper support 430 is slidably positioned on the reference support 428 and includes a coarse adjustment screw 430a for lockingly positioning the upper support 430 at a desired position along the reference support 428. The distance sensor 426 is displaceable along the reference support 428 by either moving the upper support 430 along the reference support 428 after first loosening the coarse adjustment screw 430a, or by moving the distance sensor 426 relative to the upper support 430 by turning a knurled adjustment nut 430b which is threadedly engaged with the fine adjustment screw 432.

The distance sensor 426 comprises set-up means including a push button 426a for initializing the distance sensor 426 to an initial on-band reference position on the reference support 428 when the distance sensor 426 is positioned so that the reference beam 204 is on-line with the reference band 424a of the photodetector means 424, and for initializing a display 426b to an initial output reading, e.g., zero. The distance sensor 426 further includes offset position determining means (not shown) for indicating via display 426b a distance that the distance sensor 426 and the photodetector means 424 are moved along the reference support 428 from the initial on-band reference position. The distance sensor 426 also includes an on/off push button 426c. The distance sensor 426 and the reference support 428 are commercially available from Mitutoyo Corp. via MTI Corp. of Paramus N.J.

Operation of the laser alignment apparatus 10 of the present invention for use in positioning rolls 20 and 21, relative to one another and the first and second spaced-apart substantially parallel reference planes 30 and 32 will now be described. Initially, the first projector 100 is positioned so that the reference beam 104 is substantially parallel to the head roll 21. The second projector 200 is then positioned at a given point along the offset axis 40 and is aligned with the first projector 100 so that the first and third reference beams 102 and 202 are substantially collinear with one another. When this occurs, the laser beam detector device 400 is used to align a roll 20' relative to the second reference plane 32, which is defined by the fourth reference beam 204. The detector device 400 is first placed on a first end portion 20a' of the roll 20' and the distance sensor 426, which supports the photodetector means 424, is moved relative to the roll 20' until the fourth reference beam 204 is positioned on-line with the reference band 424a of the photodetector means 424. The distance sensor 426 may be moved relative to the roll 20' by moving the carriage 420 along support rods 418 or by moving the sensor 426 along the reference support 428, as described above. When the photodetector means 424 is positioned with the reference beam 204 on-line with the reference band 424a, the circuit means 460 acts to illuminate the on-line bar 452c. Thereafter, an operator will actuate button 426a so as to initialize the distance sensor 426 to an initial on-band reference position, thereby initializing the display 426b to a zero output reading. Next, the detector device 400 is moved to the second opposing end portion 20b' of the roll 20'. The distance sensor 426 is then moved relative to the reference support 428 until the reference beam 204 is again on-line with the reference band of the photodetector means 424. The distance that the distance sensor 426 and the photodetector means 424 are moved along the reference support 428 from the initial on-band reference position is indicated on the display 426b. The position of the roll 20' is thereafter adjusted until the distance between the fourth reference beam 204 and the opposing end portion 20a' of the roll 20' substantially equals the distance between the beam 204 and the end portion 20b' of the roll 20'. When this occurs, the roll 20' is substantially in parallel alignment with the head roll 21 and the second reference plane 32.

It should be apparent that the projector 100, alone or in combination with the projector 200, may also be used for alignment of machine components, such as rolls 20 and 21, relative to a horizontal reference plane. For alignment relative to a horizontal reference plane, the projector 100 would be turned 90° from its position shown in FIG. 1 so that its rotating beam rotates in a horizontal plane instead of in a vertical plane. The detector device 400 would then be used for alignment of the rolls 20 and 21 relative to the horizontal plane, which is defined by the rotating horizontal beam.

Having described the invention in detail and by reference to preferred embodiments thereof, it will be apparent that modifications and variations are possible without departing from the scope of the invention defined in the appended claims. For example, the laser beam detector device 400 may comprise any one of the devices disclosed in U.S. Pat. Nos. 4,976,538, 4,907,874, or 4,653,910, the disclosures of which are hereby incorporated by reference. It is also contemplated by the present invention that receiving means (not shown) including beam diverting means, rotation means, position control means and telescopic means may be substituted for either the first laser beam projector or the second laser beam projector. It is additionally contemplated by the present invention, that the LCD display 452 may be mounted adjacent to the photodetector means 424 on the photosensor unit 410 instead of being mounted on the receiver means 450.

What is claimed is:

1. A laser alignment apparatus for use in positioning machine components relative to one another and first and second spaced-apart substantially parallel reference planes, said laser alignment apparatus comprising:

first projector means for providing first and second reference beams of light disposed in a substantially orthogonal relationship with respect to one another; and second projector means for providing third and fourth reference beams of light disposed in a substantially orthogonal relationship with respect to one another, said first and second projector means being positioned relative to one another so that said first and third reference beams of light are substantially collinear with one another and said second and fourth reference beams of light are positioned substantially parallel to one another, said second and fourth reference beams of light defining said first and second substantially parallel reference planes and permitting said machine components to be positioned relative to one another and said first and second parallel reference planes.

2. A laser alignment system as set forth in claim 1, wherein said first projector means comprises:
   first generator means for providing a first primary light beam in a first path;
   first beam diverting means for intercepting said first primary beam and permitting a portion of said first primary beam to pass therethrough and emerge from said first projector means as said first reference beam, and for simultaneously diverting the remainder of said first primary beam in a direction which is substantially perpendicular to said first path to emerge from said first projector means as said second reference beam; and,
   first rotation means for rotating said first beam diverting means about a first axis which is generally parallel to said first path, whereby said second reference beam rotates about said first axis and thereby produces a moving reference beam of light which defines said first reference plane.

3. A laser alignment system as set forth in claim 2, wherein said first projector means includes first position control means for controlling the position of said first generator means and said first beam diverting means to ensure that the same are maintained in a predetermined plane.

4. A laser alignment system as set forth in claim 2, wherein said second projector means comprises:
   second generator means for providing a second primary light beam in a second path;
   second beam diverting means for intercepting said second primary beam and permitting a portion of said second primary beam to pass therethrough and emerge from said second projector means as said third beam, and for simultaneously diverting the remainder of said second primary beam in a direction which is substantially perpendicular to said second path to emerge from said second projector means as said fourth beam; and,
   second rotation means for rotating said second beam diverting means about a second axis which is generally parallel to said second path, whereby said fourth beam rotates about said second axis and thereby produces a moving reference beam of light which defines said second reference plane.

5. A laser alignment system as set forth in claim 4, wherein said second projector means includes second position control means for controlling the position of said second generator means and said second beam diverting means to ensure that the same are maintained in a predetermined plane.

6. A laser alignment system as set forth in claim 4, wherein said first reference beam is intercepted by said second beam diverting means and a part of said first reference beam passes therethrough, is reflected by an end mirror on said second generator means, and is intercepted by said second beam diverting means after it is reflected by said end mirror, said second beam diverting means permitting a portion of said reflected part of said first beam to pass therethrough and simultaneously diverting the remainder of said reflected part in a direction which is substantially perpendicular to said second path to emerge from said second projector means as an alignment reference beam.

7. A laser alignment system as set forth in claim 6, wherein said second projector means further comprises telescopic means for simulating propagation of said part of said first reference beam over an extended distance resulting in an increase in a separation distance between center axes of said alignment beam and said fourth reference beam as they emerge from said second beam diverting means, said increase in separation distance between the center axes of said alignment and fourth reference beams permitting misalignment of said first and third reference beams to be easily detected, thereby permitting accurate positioning of said first and second projector means with respect to one another to collinearly align said first and third reference beams.

8. A laser alignment system as set forth in claim 7, wherein said telescopic means comprises a converging lens and a diverging lens positioned intermediate said second generator means and said second beam diverting means.

9. A laser alignment system as set forth in claim 1, wherein said second projector means comprises:
   generator means for providing a primary light beam in a predetermined path; and
   beam diverting means for intercepting said primary beam and permitting a portion of said primary beam to pass therethrough and emerge from said projector means as said third beam, and for simultaneously diverting the remainder of said primary beam in a direction which is substantially perpendicular to said predetermined path to emerge from said projector means as said fourth beam.

10. A laser alignment system as set forth in claim 9, wherein said first reference beam is intercepted by said beam diverting means and a part of said first reference beam passes therethrough, is reflected by an end mirror on said generator means, and is intercepted by said beam diverting means after it is reflected by said end mirror, said beam diverting means permitting a portion of said reflected part of said first beam to pass therethrough and simultaneously diverting the remainder of said reflected part in a direction which is substantially perpendicular to said predetermined path to emerge from said projector means as an alignment reference beam.

11. A laser alignment system as set forth in claim 10, wherein said second projector means further comprises telescopic means for simulating propagation of said part of said first reference beam over an extended distance resulting in an increase in a separation distance between center axes of said alignment and fourth reference beams as they emerge from said beam diverting means substantially perpendicular to said predetermined path, said increase in separation distance between the center axes of said alignment and fourth reference beams permitting misalignment of said first and third reference beams to be easily detected, thereby permitting accurate positioning of said first and second projector means with respect to one another to thereby collinearly align said first and third reference beams.

12. A laser alignment system as set forth in claim 11, wherein said telescopic means comprises a converging lens and a diverging lens positioned intermediate said generator means and said beam diverting means.

13. A laser alignment system as set forth in claim 1, further including a detector device for use in indicating the position of a machine component relative to one of said second and fourth reference beams, said device comprising:
   a base positionable along the machine component;
   photodetector means for sensing said one reference beam and generating detection signals in response thereto;

circuit means associated with said photodetector means for determining the relative position of said one beam relative to a reference band;

position display means connected to said circuit means for providing an indication of said position of said one beam with respect to said reference band; and variable gauge means adjustably connected to said base and mounting said photodetector means thereon for movement relative to said base to permit said photodetector means to be positioned with said one beam substantially on line with said reference band, said gauge means including indicator display means for indicating an amount of movement of said photodetector means from a first location where said beam is substantially on line with said reference band and means for initializing said indicator display means when said base is located at a first reference position along said machine component and said photodetector means is moved to said first location such that said beam is substantially on-line with said reference band, said indicator display means indicating an amount of change in the position of said photodetector means from said first location when said base is located at a second reference position along said machine component and said photodetector means is moved from said first location to a second location such that said beam is substantially on-line with said reference band.

14. A laser alignment apparatus for use in positioning first and second workpieces relative to one another and first and second spaced-apart substantially parallel reference planes, said laser alignment apparatus comprising:

first projector means for providing first and second reference beams of light disposed in a substantially orthogonal relationship with respect to one another; and second projector means for providing third and fourth reference beams of light disposed in a substantially orthogonal relationship with respect to one another, said first and second projector means being positioned relative to one another so that said first and third reference beams of light are substantially collinear with one another and said second and fourth reference beams of light are positioned substantially parallel to one another, said second and fourth reference beams of light defining said first and second substantially parallel reference planes and permitting said first and second workpieces to be positioned relative to one another and said first and second parallel reference planes.

15. A laser alignment system as set forth in claim 14, wherein said first reference beam is intercepted by said second projector means, and a part of said first reference beam is reflected by an end mirror contained therein, and is intercepted by a beam diverter after being reflected by said end mirror, said beam diverter permitting a portion of said reflected part of said first beam to pass therethrough and simultaneously diverts the remainder of said reflected part in a direction which is substantially perpendicular to said portion of said reflected part of said first beam to emerge from said second projector means as an alignment reference beam.

16. A laser alignment system as set forth in claim 15, wherein said second projector means further comprises telescopic means for simulating propagation of said first reference beam over an extended distance.

17. A laser alignment system as set forth in claim 16, wherein said telescopic means comprises a converging lens and a diverging lens located within said second projector means.

18. A laser alignment apparatus for use in positioning first and second workpieces relative to one another and first and second spaced-apart substantially parallel reference planes, said laser alignment apparatus comprising:

projector means for providing first and second reference beams of light disposed in a generally orthogonal relationship with respect to one another, said second reference beam of light being substantially disposed in said first reference plane; and receiving means for intercepting said first reference beam of light and reflecting a part of said first reference beam of light into concurrent third and fourth reference beams of light disposed in a generally orthogonal relationship with respect to one another, said projector means and said receiving means being positioned with respect to one another so that said first and third reference beams of light are substantially collinear with one another and said second and fourth reference beams are positioned substantially parallel to one another, said second and fourth reference beams defining said first and second reference planes and permitting said first and second workpieces to be positioned relative to one another and said first and second reference planes; and distance simulator means associated with said receiving means for simulating propagation of said part of said first reference beam over an extended distance as it passes into and out of said receiving means to permit said receiving means to be accurately positioned with respect to said projector means, thereby ensuring that said second and fourth reference beams are substantially parallel to one another.

19. A detector device for use in aligning a workpiece relative to a reference beam emitted from a projector, said device comprising:

a base positionable on said workpiece;

photodetector means for sensing said reference beam and generating detection signals in response thereto;

circuit means associated with said photodetector means for determining the relative position of said beam relative to a reference band;

position display means connected to said circuit means for providing an indication of said position of said beam with respect to said reference band; and variable gauge means adjustably connected to said base and mounting said photodetector means thereon for movement relative to said base to permit said photodetector means to be positioned with said beam substantially on line with said reference band, said gauge means including indicator display means for indicating an amount of movement of said photodetector means from a first location where said beam is substantially on line with said reference band and means for initializing said indicator display means when said base is located at a first reference position along said workpiece and said photodetector means is moved to said first location such that said beam is substantially on-line with said reference band, said indicator display means indicating an amount of change in the position of said photodetector means from said first location when said base is located at a second reference position along said workpiece and said photodetector means is moved from said first location to a second location such that said beam is substantially on-line with said reference band.

* * * * *

UNITED STATES PATENT AND TRADEMARK OFFICE
CERTIFICATE OF CORRECTION

PATENT NO. : 5,227,864
DATED      : July 13, 1993
INVENTOR(S) : Michael A. Yowler It is certified that error appears in the above-indentified patent and that said Letters Patent is hereby corrected as shown below:

Col. 16, line 45,     "on said workpiece" should read --along said workpiece--.

Signed and Sealed this

Twenty-ninth Day of March, 1994

*Attest:*

BRUCE LEHMAN

*Attesting Officer*     *Commissioner of Patents and Trademarks*